United States Patent
Sharma et al.

(10) Patent No.: US 12,330,633 B2
(45) Date of Patent: Jun. 17, 2025

(54) OBSTACLE AVOIDANCE FOR VEHICLE

(71) Applicant: Ford Global Technologies, LLC, Dearborn, MI (US)

(72) Inventors: Abhishek Sharma, West Bloomfield, MI (US); Michael Hafner, San Carlos, CA (US); Mohit Srinivasan, Ann Arbor, MI (US); Mrdjan J. Jankovic, Birmingham, MI (US); Erol Dogan Sumer, Ann Arbor, MI (US); Alexander Jaeckel, Ann Arbor, MI (US); Aakar Mehra, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 426 days.

(21) Appl. No.: 17/746,192

(22) Filed: May 17, 2022

(65) Prior Publication Data

US 2023/0373471 A1    Nov. 23, 2023

(51) Int. Cl.
*B60W 30/09* (2012.01)
*B60W 10/18* (2012.01)
(Continued)

(52) U.S. Cl.
CPC ............ *B60W 30/09* (2013.01); *B60W 10/18* (2013.01); *B60W 10/20* (2013.01);
(Continued)

(58) Field of Classification Search
CPC .... B60W 10/18; B60W 10/184; B60W 10/20; B60W 2050/0019; B60W 2050/0022;
(Continued)

(56) References Cited

U.S. PATENT DOCUMENTS 8,812,226 B2    8/2014    Zeng
10,216,189 B1   2/2019    Haynes
(Continued)

FOREIGN PATENT DOCUMENTS

DE        102018128890 A1    5/2020

OTHER PUBLICATIONS

Srinivasan et al., "Control of Mobile Robots Using Barrier Functions Under Temporal Logic Specifications", Journal of Latex Class Files, vol. 14, No. 8, Aug. 2015, arXiv:1908.04903v1 [cs.RO] Aug. 14, 2019.

*Primary Examiner* — Thomas Ingram
*Assistant Examiner* — Michael J Herrera
(74) *Attorney, Agent, or Firm* — Frank A. MacKenzie; Brooks Kushman P.C.

(57) ABSTRACT

A computer includes a processor and a memory, and the memory stores instructions executable by the processor to receive sensor data indicating an obstacle, formulate a control barrier function for a vehicle and the obstacle based on the sensor data, determine a control input based on the control barrier function and a combination function, and actuate a component of the vehicle according to the control input. The combination function is a sum of a first function weighted by a first weight and a second function weighted by a second weight, and the first weight and the second weight are based on a kinematic state of the obstacle.

18 Claims, 3 Drawing Sheets

(51) Int. Cl.
  *B60W 10/20* (2006.01)
  *B60W 30/095* (2012.01)
  *B60W 40/04* (2006.01)
  *B60W 50/00* (2006.01)
  *G06V 20/58* (2022.01)

(52) U.S. Cl.
  CPC ........ *B60W 30/0956* (2013.01); *B60W 40/04* (2013.01); *B60W 50/0097* (2013.01); *G06V 20/58* (2022.01); *B60W 2050/0022* (2013.01); *B60W 2420/403* (2013.01); *B60W 2554/80* (2020.02)

(58) Field of Classification Search
  CPC ... B60W 2050/0025; B60W 2420/403; B60W 2554/4041; B60W 2554/4042; B60W 2554/4044; B60W 2554/80; B60W 30/09; B60W 30/0956; B60W 40/04; B60W 50/00; B60W 50/0097; G06V 20/58
  See application file for complete search history.

(56) References Cited

U.S. PATENT DOCUMENTS

| | | | |
|---|---|---|---|
| 11,719,549 B2* | 8/2023 | Ohmura | B60W 50/0097 701/96 |
| 12,043,284 B2* | 7/2024 | Ostafew | G08G 1/165 |
| 2014/0172189 A1* | 6/2014 | Engel | G01C 21/28 701/1 |
| 2017/0155410 A1* | 6/2017 | Chang | H03M 13/47 |
| 2017/0329332 A1 | 11/2017 | Pilarski et al. | |
| 2020/0369264 A1* | 11/2020 | Cheon | B60W 30/0953 |
| 2021/0294324 A1* | 9/2021 | Jiang | B60W 10/20 |
| 2022/0048513 A1* | 2/2022 | Xu | B60W 30/18163 |
| 2023/0050299 A1* | 2/2023 | Agogino | B25J 9/1075 |
| 2023/0123469 A1* | 4/2023 | Di Cairano | B60W 10/20 701/70 |
| 2023/0174093 A1* | 6/2023 | Inoue | B60W 30/0956 340/425.5 |

\* cited by examiner

OBSTACLE AVOIDANCE FOR VEHICLE

BACKGROUND

Advanced driver assistance systems (ADAS) are groups of electronic technologies that assist drivers in driving and parking functions. Examples of ADAS include forward collision warning, lane-departure warning, blind-spot warning, automatic emergency braking, adaptive cruise control, and lane-keeping assistance.

DETAILED DESCRIPTION

Figure 1:
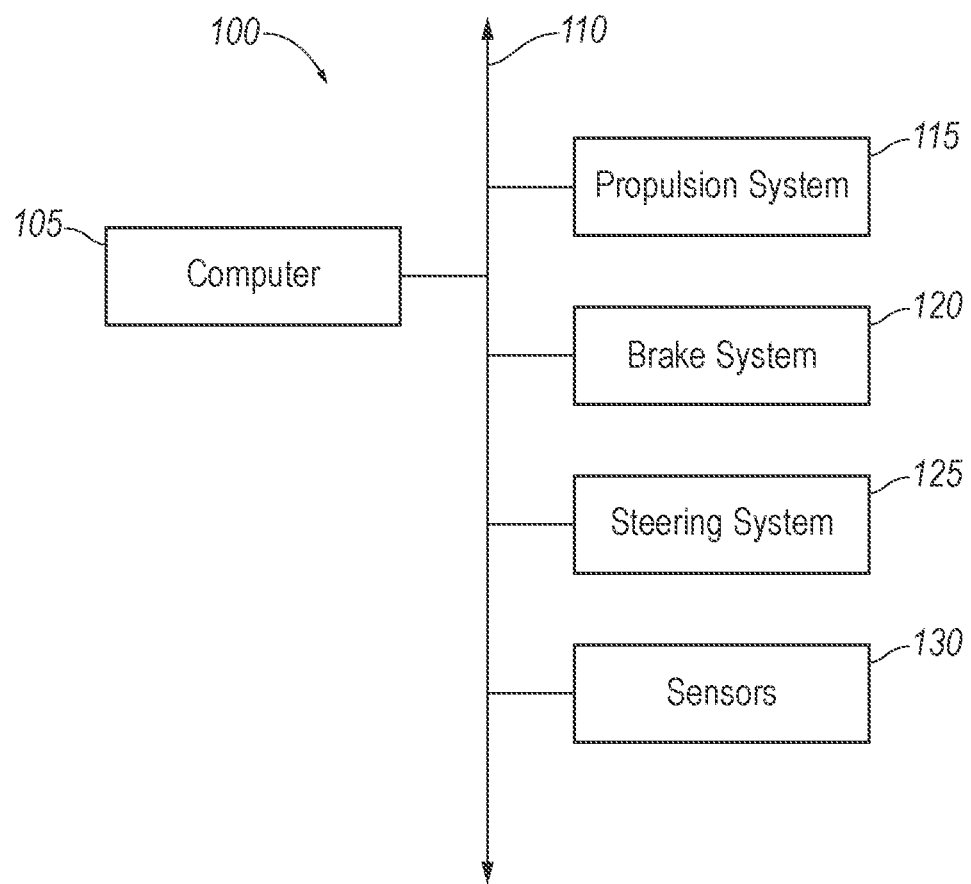
FIG. 1 is a block diagram of an example vehicle.

The techniques described herein may prevent a collision between an obstacle and a vehicle by actuating a component of the vehicle, e.g., autonomous operation or ADAS functions. For example, the system can actuate the vehicle, e.g., a brake system or steering system, to avoid the obstacle entering a buffer zone surrounding the vehicle. The buffer zone can be represented by a control barrier function. For example, a computer can receive sensor data indicating an obstacle, formulate the control barrier function for the vehicle and the obstacle based on the sensor data, determine a control input for the component of the vehicle based on the control barrier function and a combination function, and actuate the component according to the control input. The combination function is a sum of a first function weighted by a first weight and a second function weighted by a second weight, the first weight and the second weight being based on a kinematic state of the obstacle. For example, the second function can have a greater sensitivity than the first function, and the second weight can be greater relative to the first weight when the obstacle is closer to the vehicle, meaning that the sensitivity of the combination function changes according to the distance to the obstacle. As described further below, the present system may thus allow a vehicle to avoid obstacles with improved efficiency. The control barrier function and the combination function provide a computationally efficient manner for the computer to determine the control input.

A computer includes a processor and a memory, and the memory stores instructions executable by the processor to receive sensor data indicating an obstacle, formulate a control barrier function for a vehicle and the obstacle based on the sensor data, determine a control input based on the control barrier function and a combination function, and actuate a component of the vehicle according to the control input. The combination function is a sum of a first function weighted by a first weight and a second function weighted by a second weight, and the first weight and the second weight are based on a kinematic state of the obstacle.

The component of the vehicle may include a brake system.

The component of the vehicle may include a steering system.

The kinematic state of the obstacle may be a distance determined relative to the vehicle. The distance may be a distance of the obstacle from a virtual boundary extending around the vehicle. The virtual boundary may be an ellipse with a major axis aligned with a direction of forward travel of the vehicle.

The first weight and the second weight may sum to 1.

The first weight may be in a range of 0 to 1, and the second weight may be in a range of 0 to 1.

The first function may be a function of the control barrier function, and the second function may be a function of the control barrier function.

Determining the control input may be subject to a constraint based on the control barrier function. The constraint may be that a sum of a time derivative of the control barrier function and the combination function exceeds a value.

The constraint may be a first constraint, the control input may be subject to a second constraint, and the second constraint may be that the control input is below a maximum value.

The obstacle may be a first obstacle, the control barrier function may be a first control barrier function, the combination function may be a first combination function, the sensor data may indicate a second obstacle, the instructions may further include instructions to formulate a second control barrier function for the vehicle and the second obstacle based on the sensor data, and determining the control input may be subject to a second constraint based on the second control barrier function and a second combination function.

The first function may be locally Lipschitz continuous, and the second function may be locally Lipschitz continuous.

The first function may be strictly increasing and equal to zero when an argument of the first function is equal to zero, and the second function may be strictly increasing and equal to zero when an argument of the second function is equal to zero.

Determining the control input may be based on minimizing a third function of a difference between the control input and a nominal input. The nominal input may be a current value of input.

The instructions may further include instructions to receive the nominal input from an algorithm for autonomous operation of the vehicle.

The kinematic state may be an obstacle kinematic state, the instructions may further include instructions to determine a vehicle kinematic state of the vehicle, and the control barrier function may be based on the vehicle kinematic state.

A method includes receiving sensor data indicating an obstacle, formulating a control barrier function for a vehicle and the obstacle based on the sensor data, determining a control input based on the control barrier function and a combination function, and actuating a component of the vehicle according to the control input. The combination function is a sum of a first function weighted by a first weight and a second function weighted by a second weight, and the first weight and the second weight are based on a kinematic state of the obstacle.

With reference to the Figures, wherein like numerals indicate like parts throughout the several views, a computer 105 includes a processor and a memory, and the memory stores instructions executable by the processor to receive sensor data indicating an obstacle 200, formulate a control barrier function for a vehicle 100 and the obstacle 200 based on the sensor data, determine a control input based on the control barrier function and a combination function, and actuate a component of the vehicle 100 according to the control input. The combination function is a sum of a first function weighted by a first weight and a second function weighted by a second weight, and the first weight and the second weight are based on a kinematic state of the obstacle 200.

With reference to FIG. 1, the vehicle 100 may be any passenger or commercial automobile such as a car, a truck, a sport utility vehicle, a crossover, a van, a minivan, a taxi, a bus, etc.

The vehicle 100 may be an autonomous vehicle. The computer 105 can be programmed to operate the vehicle 100 independently of the intervention of a human operator, completely or to a lesser degree. The computer 105 may be programmed to operate a propulsion system 115, a brake system 120, a steering system 125, and/or other vehicle systems based on data received from sensors 130. For the purposes of this disclosure, autonomous operation means the computer 105 controls the propulsion system 115, brake system 120, and steering system 125 without input from a human operator; semi-autonomous operation means the computer 105 controls one or two of the propulsion system 115, brake system 120, and steering system 125 and a human operator controls the remainder; and nonautonomous operation means a human operator controls the propulsion system 115, brake system 120, and steering system 125.

The computer 105 is a microprocessor-based computing device, e.g., a generic computing device including a processor and a memory, an electronic controller or the like, a field-programmable gate array (FPGA), an application-specific integrated circuit (ASIC), a combination of the foregoing, etc. Typically, a hardware description language such as VHDL (VHSIC (Very High Speed Integrated Circuit) Hardware Description Language) is used in electronic design automation to describe digital and mixed-signal systems such as FPGA and ASIC. For example, an ASIC is manufactured based on VHDL programming provided pre-manufacturing, whereas logical components inside an FPGA may be configured based on VHDL programming, e.g., stored in a memory electrically connected to the FPGA circuit. The computer 105 can thus include a processor, a memory, etc. The memory of the computer 105 can include media for storing instructions executable by the processor as well as for electronically storing data and/or databases, and/or the computer 105 can include structures such as the foregoing by which programming is provided. The computer 105 can be multiple computers coupled together.

The computer 105 may transmit and receive data through a communications network 110 such as a controller area network (CAN) bus, Ethernet, WiFi, Local Interconnect Network (LIN), onboard diagnostics connector (OBD-II), and/or by any other wired or wireless communications network. The computer 105 may be communicatively coupled to the propulsion system 115, the brake system 120, the steering system 125, the sensors 130, and other components via the communications network 110.

The propulsion system 115 of the vehicle 100 generates energy and translates the energy into motion of the vehicle 100. The propulsion system 115 may be a conventional vehicle propulsion subsystem, for example, a conventional powertrain including an internal-combustion engine coupled to a transmission that transfers rotational motion to wheels; an electric powertrain including batteries, an electric motor, and a transmission that transfers rotational motion to the wheels; a hybrid powertrain including elements of the conventional powertrain and the electric powertrain; or any other type of propulsion. The propulsion system 115 can include an electronic control unit (ECU) or the like that is in communication with and receives input from the computer 105 and/or a human operator. The human operator may control the propulsion system 115 via, e.g., an accelerator pedal and/or a gear-shift lever.

The brake system 120 is typically a conventional vehicle braking subsystem and resists the motion of the vehicle 100 to thereby slow and/or stop the vehicle 100. The brake system 120 may include friction brakes such as disc brakes, drum brakes, band brakes, etc.; regenerative brakes; any other suitable type of brakes; or a combination. The brake system 120 can include an electronic control unit (ECU) or the like that is in communication with and receives input from the computer 105 and/or a human operator. The human operator may control the brake system 120 via, e.g., a brake pedal.

The steering system 125 is typically a conventional vehicle steering subsystem and controls the turning of the wheels. The steering system 125 may be a rack-and-pinion system with electric power-assisted steering, a steer-by-wire system, as both are known, or any other suitable system. The steering system 125 can include an electronic control unit (ECU) or the like that is in communication with and receives input from the computer 105 and/or a human operator. The human operator may control the steering system 125 via, e.g., a steering wheel.

The sensors 130 may provide data about operation of the vehicle 100, for example, wheel speed, wheel orientation, and engine and transmission data (e.g., temperature, fuel consumption, etc.). The sensors 130 may detect the location and/or orientation of the vehicle 100. For example, the sensors 130 may include global positioning system (GPS) sensors; accelerometers such as piezo-electric or microelectromechanical systems (MEMS); gyroscopes such as rate, ring laser, or fiber-optic gyroscopes; inertial measurements units (IMU); and magnetometers. The sensors 130 may detect the external world, e.g., objects and/or characteristics of surroundings of the vehicle 100, such as other vehicles, road lane markings, traffic lights and/or signs, pedestrians, etc. For example, the sensors 130 may include radar sensors, ultrasonic sensors, scanning laser range finders, light detection and ranging (LIDAR) devices, and image processing sensors such as cameras.

Figure 2:
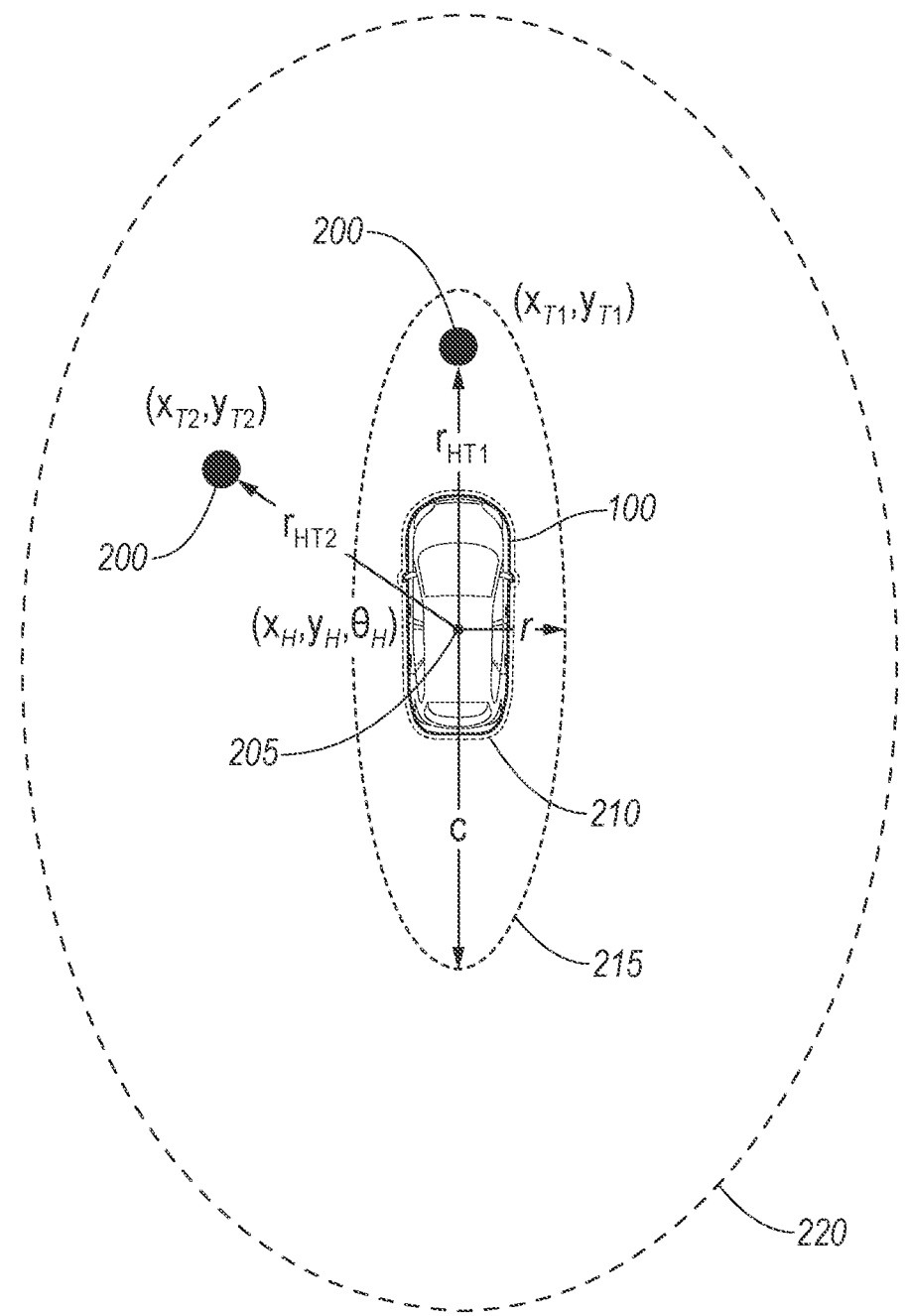
FIG. 2 is a diagrammatic top view of the vehicle with example obstacles.

With reference to FIG. 2, the computer 105 can be programmed to determine a vehicle kinematic state of the vehicle 100. For the purposes of this disclosure, a "kinematic state" is defined as a mathematical description of the position and/or motion of an entity. For example, the vehicle kinematic state can include a position, a heading, a velocity vector, and a yaw rate. The position of the vehicle 100 can be the position of a predefined point 205 of the vehicle 100, e.g., the center of gravity or the center of a rear axle. The components of the velocity vector of the vehicle 100 can be given by the following equations:

$$\dot{x}_H = v_H \cos \theta_H$$

$$\dot{y}_H = v_H \sin \theta_H$$

in which $(x_H, y_H)$ is the position of the vehicle 100, the dot above a variable indicates a time derivative, $v_H$ is the longitudinal velocity, i.e., speed, of the vehicle 100, and $\theta_H$ is the heading of the vehicle 100. The yaw rate of the vehicle 100 can be given by the following equation:

$$\dot{\theta}_H = \omega_H = \frac{v_H \tan \delta}{W}$$

in which δ is the steering angle of the vehicle 100 and W is the wheelbase of the vehicle 100, i.e., the longitudinal distance between a front axle and the rear axle.

The computer 105 can be programmed to determine the vehicle kinematic state based on sensor data from the sensors 130. For example, the sensors 130 can return the position from a GPS sensor, the speed $v_H$ of the vehicle 100 from wheel speed sensors, the heading $\theta_H$ of the vehicle 100 from an IMU, and the steering angle δ from the steering system 125.

The computer 105 can be programmed to actuate a component of the vehicle 100 according to an input. For the purposes of this disclosure, an "input" is one or more values that control operation of a component of the vehicle 100. For example, the component can be the brake system 120, and the input can include the acceleration $a_H = \dot{v}_H$ of the vehicle 100. Actuating the brake system 120 according to the input of the acceleration $a_H$ of the vehicle 100 can include engaging the brake system 120 so that the acceleration $a_H$ matches the acceleration $a_H$ specified in the input. For another example, the component can be the steering system 125, and the input can include the steering angle δ. Actuating the steering system 125 according to the input of the steering angle δ can include turning the wheels until the wheels are oriented at the steering angle δ.

The computer 105 can be programmed to receive a nominal input. The nominal input can be a current value of the input. For example, if an operator is manually operating the vehicle 100, the nominal input can be the current values of the values forming the input, e.g., current values of the speed vii of the vehicle 100 and/or the steering angle δ. For another example, if the computer 105 is operating the vehicle 100 autonomously, the nominal input can be values commanded by an algorithm for autonomous operation of the vehicle 100. The computer 105 can receive the nominal input from the algorithm. In the absence of a control input (determined as will be described below), the computer 105 can be programmed to actuate the components of the vehicle 100 according to the nominal input.

The computer 105 can be programmed to receive sensor data from the sensors 130 indicating one or more obstacles 200. For example, FIG. 2 shows two obstacles 200, indicated in the variables with subscripts 1 and 2. The sensor data can include positions, headings, velocity vectors, and/or contours of the obstacles 200. The positions are labeled in FIG. 2 as $(x_{T1}, y_{T1})$ and $(x_{T2}, y_{T2})$. The sensor data can thereby define an obstacle kinematic state. For example, the position of the obstacle 200 can be represented as a distance $r_{HT}$ relative to the vehicle 100, e.g., from the predefined point 205 of the vehicle 100 to the obstacle 200, and a direction $\theta_{HT}$ relative to the vehicle 100, e.g., from the predefined point 205 of the vehicle 100 to the obstacle 200. The velocity vector can be represented by a speed $v_T$ of the obstacle 200 and a heading $\theta_T$ of the obstacle 200.

The computer 105 can be programmed to formulate a control barrier function $h_H$ for the vehicle 100 and the obstacle 200 based on the sensor data, i.e., based on the obstacle 200. The control barrier function $h_H$ can be a difference between the distance $r_{HT}$ from the predefined point 205 of the vehicle 100 to the obstacle 200 and a point on a first virtual boundary 210 in the direction $\theta_{HT}$ from the predefined point 205 of the vehicle 100 to the obstacle 200. The first virtual boundary 210 can be represented as a function $\Gamma_H$ of the direction $\theta_{HT}$ that returns a distance from the predefined point 205 of the vehicle 100 in the direction $\theta_{HT}$ to the first virtual boundary 210. The first control barrier function $h_H$ can be a function of the vehicle kinematic state and the obstacle kinematic state. For example, the first control barrier function $h_H$ can be represented by the following equation:

$$h_H(r_H, \theta_H, \theta_{HT}, v_H, v_T) = r_H - \Gamma(\theta_{HT})$$

The control barrier function $h_H$ provide a computationally efficient manner for the computer 105 to determine the control input, described below. For example, the computer 105 can determine constraints based on the control barrier function and solve an optimization problem subject to the constraints using a quadratic program, as will be described in turn. Quadratic programming is an efficient technique for solving the optimization problem, and the use of the control barrier function permits formulation of the optimization problem in the manner required for quadratic programming.

Determining the control input (described below) can be subject to a first constraint based on the control barrier function $h_H$. The first constraint can be that a sum of a time derivative of the control barrier function $h_H$ and a combination function $\alpha(\cdot)$ of the control barrier function $h_H$ exceeds a value. The value can be zero. For example, the first constraint can be represented by the following equation:

$$\dot{h}_H + \alpha(h_H) \geq 0$$

The combination function $\alpha(\cdot)$ can be locally Lipschitz continuous; i.e., within a range of the combination function $\alpha(\cdot)$ that is implicated by the first constraint, the absolute value of the slope between any two points is not greater than a predefined real number. In other words, there is a maximum rate of change of the combination function $\alpha(\cdot)$ with respect to the first control barrier function $h_H$. The combination function $\alpha(\cdot)$ can be a class κ function, i.e., is strictly increasing and is equal to zero when the argument is zero, i.e., $\alpha(0)=0$. The combination function $\alpha(\cdot)$ can be chosen to cause the component of the vehicle 100 to actuate in time to prevent the vehicle 100 from contacting the obstacle 200.

The combination function $\alpha(\cdot)$ can be a sum of a first function $\alpha_1(\cdot)$ weighted by a first weight γ and a second function $\alpha_2(\cdot)$ weighted by a second weight β:

$$\alpha(h_H, X) = \gamma \alpha_1(h_H) + \beta \alpha_2(h_H)$$

The combination function $\alpha(\cdot)$ can be a function of the control barrier function $h_H$ and of the obstacle kinematic state X. For example, the first function $\alpha_1(\cdot)$ and second function $\alpha_2(\cdot)$ can be functions of the control barrier function $h_H$, and the first weight γ and the second weight β can be functions of the obstacle kinematic state X measured relative to the vehicle 100, as will each be described in more detail below.

The first function $\alpha_1(\cdot)$ can be a function of the control barrier function $h_H$, i.e., $\alpha_1(h_H)$. The first function $\alpha_1(\cdot)$ can be locally Lipschitz continuous; i.e., within a range of the first function $\alpha_1(\cdot)$ that is implicated by the first constraint, the absolute value of the slope between any two points is not greater than a predefined real number. The first function $\alpha_1(\cdot)$ can be a class κ function, i.e., is strictly increasing and is equal to zero when the argument is zero, i.e., $\alpha_1(0)=0$. The first function $\alpha_1(\cdot)$ can be chosen to cause the component of the vehicle 100 to actuate in time to prevent the vehicle 100 from contacting the obstacle 200 for situations in which, compared to the second function $\alpha_2(\cdot)$, the obstacle 200 is less likely to contact the vehicle 100, e.g., is farther from the vehicle 100 and/or more laterally offset from the vehicle 100, i.e., to left or to the right relative to the vehicle 100. For example, the first function $\alpha_1(\cdot)$ can be comparatively less sensitive to changes in the obstacle kinematic state X than the second function $\alpha_2(\cdot)$ is. For example, the first function $\alpha_1(\cdot)$ can be a product of a parameter $\lambda_1$ and the control barrier function $h_H$, i.e., varying linearly with the control barrier function $h_H$:

$$\alpha_1(h_H)=\lambda_1 h_H$$

The parameter $\lambda_1$ can be chosen to control the sensitivity of the first function $\alpha_1(\cdot)$ in combination with the power of the control barrier function $h_H$, in this case 1, e.g., $\lambda_1=3$.

The second function $\alpha_2(\cdot)$ can be a function of the control barrier function $h_H$, i.e., $\alpha_1(h_H)$. The second function $\alpha_2(\cdot)$ can be locally Lipschitz continuous; i.e., within a range of the second function $\alpha_2(\cdot)$ that is implicated by the first constraint, the absolute value of the slope between any two points is not greater than a predefined real number. The second function $\alpha_2(\cdot)$ can be a class $\kappa$ function, i.e., is strictly increasing and is equal to zero when the argument is zero, i.e., $\alpha_2(0)=0$. The second function $\alpha_2(\cdot)$ can be chosen to cause the component of the vehicle 100 to actuate in time to prevent the vehicle 100 from contacting the obstacle 200 for situations in which, compared to the first function $\alpha_1(\cdot)$ the obstacle 200 is more likely to contact the vehicle 100, e.g., is closer to the vehicle 100 and/or more laterally centered with respect to the vehicle 100. For example, the second function $\alpha_2(\cdot)$ can be comparatively more sensitive to changes in the obstacle kinematic state X than the first function $\alpha_1(\cdot)$ is. For example, the second function $\alpha_2(\cdot)$ can be a product of a parameter $\lambda_2$ and a power greater than 1 of the control barrier function $h_H$, e.g., the cube of the control barrier function $h_H$, i.e., varying cubically with the control barrier function $h_H$:

$$\alpha_2(h_H)=\lambda_2 h_H^3$$

The parameter $\lambda_2$ can be chosen to control the sensitivity of the second function $\alpha_2(\cdot)$ in combination with the power of the control barrier function $h_H$, in this case 3, e.g., $\lambda_1=0.9$.

The first weight $\gamma$ can be in a range of 0 to 1, and the second weight $\beta$ can be in a range of 0 to 1. The first weight $\gamma$ and the second weight $\beta$ can sum to 1, i.e., $\beta=1-\gamma$. For example, the first weight $\gamma$ can be a value d to which a floor of 0 and a ceiling of 1 is applied, e.g., $\gamma=\max(0, \min(d, 1))$. The combination function $\alpha(\cdot)$ can therefore be a convex combination of the first function $\alpha_1(\cdot)$ and the second function $\alpha_2(\cdot)$, i.e., a linear combination of points in which all coefficients are nonnegative and sum to 1, e.g.:

$$\alpha(h_H,X)=\gamma\lambda_1 h_H+(1-\gamma)\lambda_2 h_H^3$$

The first weight $\gamma$ and the second weight $\beta$ can be based on the obstacle kinematic state X, e.g., a distance determined relative to the vehicle 100, e.g., a distance of the obstacle 200 from a second virtual boundary 215 extending around the vehicle 100. The second virtual boundary 215 can be an ellipse centered on the vehicle 100, e.g., on the predefined point 205, with a major axis aligned with a direction of forward travel of the vehicle 100, i.e., the major axis extends longitudinally relative to the vehicle 100 and the minor axis extends laterally relative to the vehicle 100. The distance can be the value d referenced directly above. The distance d can be represented by the following equation:

$$d = \left(\frac{(x_T - x_H)\cos\theta_H + (y_T - y_H)\sin\theta_H}{C}\right)^2 + (-(x_T - x_H)\sin\theta_H + (y_T - y_H)\cos\theta_H)^2 - r^2$$

in which $(x_T, y_T)$ is the position of the obstacle 200, C is the major axis of the second virtual boundary 215, and r is the minor axis of the second virtual boundary 215. Thus, when the obstacle 200 is on or inside the second virtual boundary 215, the combination function $\alpha(\cdot)$ equals the more sensitive second function $\alpha_2(\cdot)$. As the obstacle 200 moves away from the second virtual boundary 215, the balance of the combination function $\alpha(\cdot)$ shifts from the second function $\alpha_2(\cdot)$ to the first function $\alpha_1(\cdot)$ until the obstacle 200 reaches a third virtual boundary 220. When the obstacle 200 is on or outside of the third virtual boundary 220, the combination function $\alpha(\cdot)$ equals the less sensitive first function $\alpha_1(\cdot)$. The third virtual boundary 220 can be an ellipse centered on the vehicle 100, e.g., on the predefined point 205, with a major axis aligned with a direction of forward travel of the vehicle 100, i.e., the major axis extends longitudinally relative to the vehicle 100 and the minor axis extends laterally relative to the vehicle 100. The weights $\gamma$, $\beta$ thus provide greater sensitivity closer to the vehicle 100, less sensitivity farther from the vehicle 100, and a smooth transition between the regions of greater and less sensitivity. The elliptical shape of the second and third virtual boundaries 215, 220 with longitudinal major axes provides greater sensitivity for obstacles 200 closer to the path of the vehicle 100, i.e., more laterally centered relative to the vehicle 100.

Determining the control input (described below) can be subject to a subject to a constraint. The second constraint can be that the control input is below a maximum value, e.g., as represented by the following equation:

$$|u|\leq u_{max}$$

in which u is the control input and $u_{max}$ is the maximum value. The maximum value $u_{max}$ can be chosen based on the capabilities of the component of the vehicle 100 that is controlled by the input, e.g., the brake system 120 and/or the steering system 125.

The computer 105 can be programmed to determine the control input u based on the control barrier function $h_H$ and the combination function $\alpha(\cdot)$. For example, determining the control input u can include minimizing a function of a difference between the control input u and the nominal input $u_{nom}$. For example, determining the control input u can include solving a quadratic program based on the control barrier function $h_H$ and the combination function $\alpha(\cdot)$ e.g., subject to the first constraint. Quadratic programming means solving optimization problems formulated as quadratic functions. For example, solving the quadratic program can include minimizing a square of the difference between the control input u and the nominal input $u_{nom}$, subject to the first and second constraints above, e.g., as represented by the following formula:

$$\min_{u\in\mathbb{R}^m}\|u - u_{nom}\|_2^2$$

in which $\mathbb{R}^m$ is the set of m-length vectors of real numbers. For example, if the control input u includes the speed $v_H$ of the vehicle 100 and the steering angle $\delta$ then the length m of the vector of the control input u is 2.

In the event of multiple obstacles 200, the computer 105 can be programmed to determine the control input u based on the control barrier function $h_H$ for all or a subset of the obstacles 200. For example, if two obstacles 200 are present as shown in FIG. 2, determining the control input u can include solving a quadratic program as described above subject to two first constraints (one for each obstacle 200) and the second constraint.

The computer 105 can be programmed to actuate the component of the vehicle 100, e.g., the brake system 120 and/or steering system 125, according to the control input u. For example, the computer 105 can be programmed to actuate the component according to the control input u in response to the computer 105 determining the control input u and to actuate the component according to the nominal input $u_{nom}$, otherwise.

Figure 3:
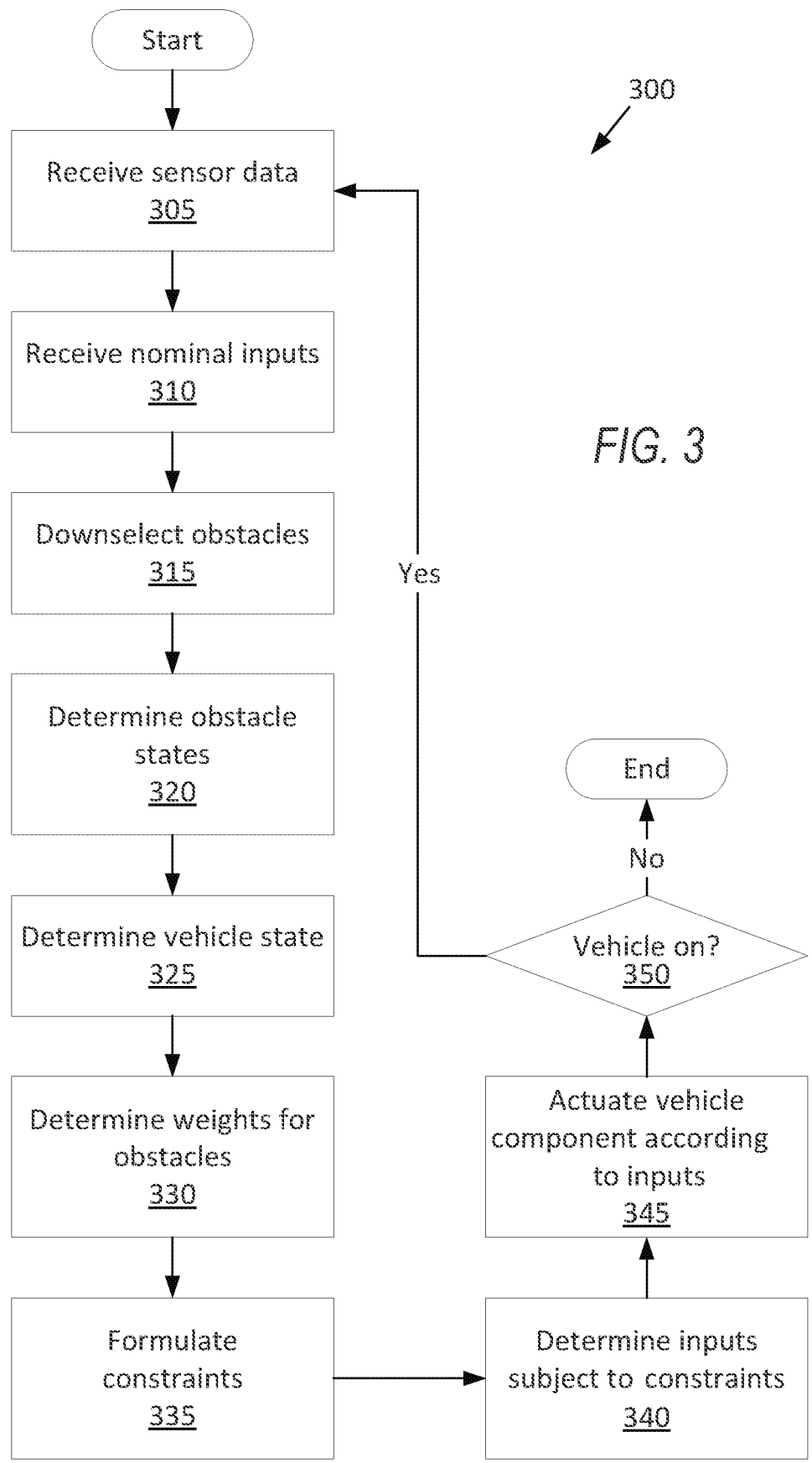
FIG. 3 is a process flow diagram of an example process for controlling the vehicle.

FIG. 3 is a process flow diagram illustrating an exemplary process 300 for controlling the vehicle 100. The memory of the computer 105 stores executable instructions for performing the steps of the process 300 and/or programming can be implemented in structures such as mentioned above. As a general overview of the process 300, the computer 105 receives data from the sensors 130, receives the nominal input $u_{nom}$, downselects the obstacles 200 present in the sensor data, determines the obstacle kinematic states, determines the vehicle kinematic state, determines the weights γ, β, formulates the first and second constraints, solves the quadratic program for the control input u subject to the constraints, and actuates the component of the vehicle 100 according to the control input u. The process 300 can continue for as long as the vehicle 100 remains on.

The process 300 begins in a block 305, in which the computer 105 receives the sensor data from the sensors 130 indicating the obstacles 200.

Next, in a block 310, the computer 105 receives the nominal input $u_{nom}$.

Next, in a block 315, the computer 105 downselects the obstacles 200 present in the sensor data, i.e., reduces the number of obstacles 200 under consideration. For the purposes of this disclosure, downselection is selecting a subset of items from a typically larger set of items. For example, the computer 105 can select the five closest obstacles 200 to the vehicle 100, e.g., with the smallest values for $r_{HT}$. Downselection can save processing time for the computer 105 when combined with determining the control input u based on the control barrier functions $h_H$ by capping the number of times that the control input u is solved for.

Next, in a block 320, the computer 105 determines the obstacle kinematic states for the downselected obstacles 200, as described above.

Next, in a block 325, the computer 105 determines the vehicle kinematic state, as described above.

Next, in a block 330, the computer 105 determines the weights γ, β based on the obstacle kinematic state, as described above.

Next, in a block 335, for each downselected obstacle 200, the computer 105 formulates the control barrier function $h_H$, and the computer 105 determines the first constraint based on the control barrier function $h_H$ and the combination function α(·) as described above. The computer 105 also formulates the second constraint, as described above.

Next, in a block 340, the computer 105 determines the control input u based on the control barrier function $h_H$ and the combination function α(·) for each of the downselected obstacles 200, as described above.

Next, in a block 345, the computer 105 actuates the component of the vehicle 100, e.g., the brake system 120 and/or the steering system 125, according to the control input u, as described above, e.g., for the control input u having the most extreme value from among the multiple control inputs u determined in the block 340. The most extreme value of the control input u can correspond to the obstacle 200 needing to be avoided from among the downselected obstacles 200.

Next, in a decision block 350, the computer 105 determines whether the vehicle 100 is still on. If so, the process 300 returns to the block 305 to continue receiving sensor data. If not, the process 300 ends.

In general, the computing systems and/or devices described may employ any of a number of computer operating systems, including, but by no means limited to, versions and/or varieties of the Ford Sync® application, AppLink/Smart Device Link middleware, the Microsoft Automotive® operating system, the Microsoft Windows® operating system, the Unix operating system (e.g., the Solaris® operating system distributed by Oracle Corporation of Redwood Shores, California), the AIX UNIX operating system distributed by International Business Machines of Armonk, New York, the Linux operating system, the Mac OSX and iOS operating systems distributed by Apple Inc. of Cupertino, California, the BlackBerry OS distributed by Blackberry, Ltd. of Waterloo, Canada, and the Android operating system developed by Google, Inc. and the Open Handset Alliance, or the QNX® CAR Platform for Infotainment offered by QNX Software Systems. Examples of computing devices include, without limitation, an on-board vehicle computer, a computer workstation, a server, a desktop, notebook, laptop, or handheld computer, or some other computing system and/or device.

Computing devices generally include computer-executable instructions, where the instructions may be executable by one or more computing devices such as those listed above. Computer executable instructions may be compiled or interpreted from computer programs created using a variety of programming languages and/or technologies, including, without limitation, and either alone or in combination, Java™, C, C++, Matlab, Simulink, Stateflow, Visual Basic, Java Script, Python, Perl, HTML, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer readable medium, etc., and executes these instructions, thereby performing one or more processes, including one or more of the processes described herein. Such instructions and other data may be stored and transmitted using a variety of computer readable media. A file in a computing device is generally a collection of data stored on a computer readable medium, such as a storage medium, a random access memory, etc.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Instructions may be transmitted by one or more transmission media, including fiber optics, wires, wireless communication, including the internals that comprise a system bus coupled to a processor of a computer. Common forms of computer-readable media include, for example, RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), a nonrelational database (NoSQL), a graph database (GDB), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

In the drawings, the same reference numbers indicate the same elements. Further, some or all of these elements could be changed. With regard to the media, processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted.

All terms used in the claims are intended to be given their plain and ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary. The adjectives "first," "second," and "third" are used throughout this document as identifiers and are not intended to signify importance, order, or quantity. Use of "in response to" and "upon determining" indicates a causal relationship, not merely a temporal relationship.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. A computer comprising a processor and a memory, the memory storing instructions executable by the processor to:
   receive sensor data indicating an obstacle;
   formulate a control barrier function measuring a distance between a vehicle and the obstacle based on the sensor data;
   determine a control input based on the control barrier function and a combination function, the combination function being a sum of a first function weighted by a first weight and a second function weighted by a second weight, the first weight and the second weight being based on a kinematic state of the obstacle;
   wherein the first function is a function of the control barrier function, and the second function is a function of the control barrier function;
   actuate a component of the vehicle according to the control input;
   wherein determining the control input is subject to a constraint based on the control barrier function; and
   the constraint is that a sum of a time derivative of the control barrier function and the combination function exceeds a value.

2. The computer of claim 1, wherein the component of the vehicle includes a brake system.

3. The computer of claim 1, wherein the component of the vehicle includes a steering system.

4. The computer of claim 1, wherein the kinematic state of the obstacle includes the distance determined relative to the vehicle.

5. The computer of claim 4, wherein the distance is a distance of the obstacle from a virtual boundary extending around the vehicle.

6. The computer of claim 5, wherein the virtual boundary is an ellipse with a major axis aligned with a direction of forward travel of the vehicle.

7. The computer of claim 1, wherein the first weight and the second weight sum to 1.

8. The computer of claim 1, wherein the first weight is in a range of 0 to 1, and the second weight is in a range of 0 to 1.

9. The computer of claim 1, wherein the constraint is a first constraint, the control input is subject to a second constraint, and the second constraint is that the control input is below a maximum value.

10. The computer of claim 1, wherein the obstacle is a first obstacle, the control barrier function is a first control barrier function, the combination function is a first combination function, the sensor data indicates a second obstacle, the instructions further include instructions to formulate a second control barrier function for the vehicle and the second obstacle based on the sensor data, and determining the control input is subject to a second constraint based on the second control barrier function and a second combination function.

11. The computer of claim 1, wherein the first function is locally Lipschitz continuous, and the second function is locally Lipschitz continuous.

12. The computer of claim 1, wherein the first function is equal to zero when an argument of the first function is equal to zero, the first function is strictly increasing as the argument of the first function increases, the second function is equal to zero when an argument of the second function is equal to zero, and the second function is strictly increasing as the argument of the second function increases.

13. The computer of claim 1, wherein determining the control input is based on minimizing a third function of a difference between the control input and a nominal input.

14. The computer of claim 13, wherein the nominal input is a current value of input.

15. The computer of claim 13, wherein the instructions further include instructions to receive the nominal input from an algorithm for autonomous operation of the vehicle.

16. The computer of claim 1, wherein the kinematic state is an obstacle kinematic state, the instructions further include instructions to determine a vehicle kinematic state of the vehicle, and the control barrier function is based on the vehicle kinematic state.

17. The computer of claim 1, wherein the first function has a first sensitivity to a change in the kinematic state of the obstacle relative to the vehicle, the second function has a second sensitivity to the change in the kinematic state of the obstacle relative to the vehicle, and the first sensitivity is different than the second sensitivity.

18. A method comprising:

receiving sensor data indicating an obstacle;

formulating a control barrier function measuring a distance between a vehicle and the obstacle based on the sensor data;

determining a control input based on the control barrier function and a combination function, the combination function being a sum of a first function weighted by a first weight and a second function weighted by a second weight, the first weight and the second weight being based on a kinematic state of the obstacle;

wherein the first function is a function of the control barrier function, and the second function is a function of the control barrier function;

actuating a component of the vehicle according to the control input;

wherein determining the control input is subject to a constraint based on the control barrier function; and the constraint is that a sum of a time derivative of the control barrier function and the combination function exceeds a value.

* * * * *